United States Patent
Vidhani et al.

(10) Patent No.: US 9,928,381 B2
(45) Date of Patent: Mar. 27, 2018

(54) DATA PRIVACY MANAGEMENT

(71) Applicant: Tata Consultancy Services Limited, Mumbai, Maharashtra (IN)

(72) Inventors: Kumar Mansukhlal Vidhani, Maharashtra (IN); Akhil Anand Dixit, Maharashtra (IN); Vijayanand Mahadeo Banahatti, Maharashtra (IN); Sachin P. Lodha, Maharashtra (IN)

(73) Assignee: TATA CONSULTANCY SERVICES LIMITED, Mumbai, Maharashtra (IN)

( * ) Notice: Subject to any disclaimer, the term of this patent is extended or adjusted under 35 U.S.C. 154(b) by 0 days.

(21) Appl. No.: 14/937,422

(22) Filed: Nov. 10, 2015

(65) Prior Publication Data
US 2016/0132696 A1 May 12, 2016

(30) Foreign Application Priority Data
Nov. 11, 2014 (IN) .......................... 3559/MUM/2014

(51) Int. Cl.
*G06F 21/62* (2013.01)
*G06Q 30/00* (2012.01)
*G06Q 10/10* (2012.01)

(52) U.S. Cl.
CPC ......... *G06F 21/6245* (2013.01); *G06Q 30/00* (2013.01); *G06Q 10/10* (2013.01)

(58) Field of Classification Search
CPC ..... G06F 21/6245; G06Q 30/00; G06Q 10/10
See application file for complete search history.

(56) References Cited

U.S. PATENT DOCUMENTS

| | | | |
|---|---|---|---|
| 7,039,594 B1* | 5/2006 | Gersting | G06Q 10/06 705/14.73 |
| 7,240,032 B2 | 7/2007 | Villapudua | |
| 7,353,532 B2 | 4/2008 | Duri et al. | |
| 9,461,972 B1* | 10/2016 | Mehta | H04L 63/0435 |
| 2002/0087472 A1 | 7/2002 | Walter | |
| 2003/0200286 A1* | 10/2003 | Barfurth | H04L 41/0806 709/220 |
| 2008/0215509 A1* | 9/2008 | Charlton | G06F 21/604 706/11 |
| 2009/0292984 A1* | 11/2009 | Bauchot | G06F 17/30896 715/234 |
| 2011/0099602 A1* | 4/2011 | Apparao | G06Q 10/06 726/1 |

(Continued)

*Primary Examiner* — Mohammad A Siddiqi
(74) *Attorney, Agent, or Firm* — Thompson Hine LLP

(57) ABSTRACT

A system and a method for managing privacy of data are provided. The method includes causing generation of a trigger notification notifying an access to one or more fields of a user-profile in a first application. The trigger notification generated is by a second application integrated with the first application. The first application includes a plurality of fields comprising sensitive data associated with the user-profile. The method further includes enforcing one or more access preferences corresponding to the one or more fields by the second application on the generation of the trigger notification. The one or more access preferences are based at least on one of a plurality of preconfigured rules and contextual information associated with the trigger notification. Enforcing the one or more access preferences facilitates in managing data privacy.

11 Claims, 11 Drawing Sheets

(56) References Cited

U.S. PATENT DOCUMENTS

| | | | |
|---|---|---|---|
| 2011/0173676 A1* | 7/2011 | Peckover | G06F 21/6245 726/3 |
| 2012/0151597 A1* | 6/2012 | Gupta | G06F 21/6254 726/26 |
| 2013/0041871 A1* | 2/2013 | Das | G06F 17/30896 707/662 |
| 2013/0159021 A1* | 6/2013 | Felsher | G06F 19/322 705/3 |
| 2014/0123303 A1* | 5/2014 | Shukla | G06F 21/6254 726/26 |
| 2014/0165133 A1* | 6/2014 | Foley | H04L 63/14 726/1 |

* cited by examiner

| Ⓐ INTERNAL USAGE ? | | | | |
|---|---|---|---|---|
| PII FIELDS | ALWAYS ALLOW | SEND NOTICE | ASK CONSENT | ALWAYS DENY |
| PAN NUMBER | | | ● | |
| DATE OF BIRTH | | | ● | |
| EMAIL | | | ● | |
| ADDRESS | | ● | ● | |
| MOBILE NUMBER | | | ● | |
| DOMAIN SPECIFIC FIELDS | ALWAYS ALLOW | SEND NOTICE | ASK CONSENT | ALWAYS DENY |
| DEBIT CARD NO. | | | ● | |
| CVV NUMBER | | | ● | |
| TOTAL BALANCE | | ● | | |
| CARD EXPIRY DATE | | ● | | |

FIG. 6A

| Ⓑ THIRD PARTY USAGE ? | | | | |
|---|---|---|---|---|
| PII FIELDS | ALWAYS ALLOW | SEND NOTICE | ASK CONSENT | ALWAYS DENY |
| PAN NUMBER | | ● | | |
| DATE OF BIRTH | | ● | | |
| EMAIL | | ● | | |
| ADDRESS | | | ● | |
| MOBILE NUMBER | | | | ● |
| DOMAIN SPECIFIC FIELDS | ALWAYS ALLOW | SEND NOTICE | ASK CONSENT | ALWAYS DENY |
| DEBIT CARD NO. | | | ● | |
| CVV NUMBER | | | ● | ● |
| TOTAL BALANCE | | ● | | |
| CARD EXPIRY DATE | | ● | | |

FIG. 6B

| PERSONAL INFORMATION | | |
|---|---|---|
| PRIMARY USER | JOHN SMITH | 710 |
| NATIONALITY | INDIAN | |
| EMAIL | XXXXXX@XXXXX.XXX | |
| DATE OF BIRTH | XXXX-XX-XX | |
| PLACE OF BIRTH | GUWAHATI | |
| OCCUPATION | BUSINESS PROFESSIONAL | |
| MOBILE NO. | ********900 | |
| OFFICE TEL | 20161093 | |
| RESIDENCE TEL | 22291872 | |
| ADDRESS | XX #XXX-XXXX XXXXXXX, XX | |
| PAN NUMBER | XXXXXXXXXX7 | |
| PREFERRED LANGUAGE | ENGLISH | |
| CARD TYPE | TATA GOLD CREDUT CARD | |
| CARD NUMBER | XXXXXXXXXXX | |
| ISSUE DATE | 25-11-2010 | |
| EXPIRY DATE | XX-XX-XXXX | SUBMIT |

FIG. 7A

| PERSONAL INFORMATION | | |
|---|---|---|
| PRIMARY USER | JOHN SMITH | 710 |
| NATIONALITY | INDIAN | |
| EMAIL | XXXXXX@XXXXX.XXX | |
| DATE OF BIRTH | XXXX | AUTHENTICATION 752 |
| PLACE OF BIRTH | GUWA | CUST ID  5 |
| OCCUPATION | BUSIN | ● SHARE DATA WITH THIRD PARTY |
| MOBILE NO. | ***** | ○ IMPROVE INTERNAL |
| OFFICE TEL | 2016 | PRODUCTS & SERVICES |
| RESIDENCE TEL | 2229 | |
| ADDRESS | XX #X | REMARKS FOR MARKETING PURPOSE |
| PAN NUMBER | XXX | |
| PREFERRED LANGUAGE | ENGL | |
| CARD TYPE | TATA | OK  CANCEL |
| CARD NUMBER | XXXXXXXXXXX | |
| ISSUE DATE | 25-11-2010 | |
| EXPIRY DATE | XX-XX-XXXX | SUBMIT |

FIG. 7B

| PRIVACY PREFERENCE | ANALYTICS | PRIVACY STATEMENT | | | | | | |
|---|---|---|---|---|---|---|---|---|
| MONTH & YEAR [OCTOBER] [2015] | | | | | | | | [CREATE STATEMENT] |
| FIELD | PERSON VIEWING DATA | PURPOSE | PREFERENCE | FINAL ACTION | TIMESTAMP | DEVICE | OS VERSION | LOCATION |
| DATE OF BIRTH | ADMIN | SHARE DATA WITH THIRD PARTY | ASK CONSENT | REQUEST TIMEOUT | 2015-10-13 11:06:49.204 | NA | NA | NA |
| EMAIL | ADMIN | IMPROVE INTERNAL PRODUCTS & SERVICES | SEND NOTICE | ALLOWED | 2015-09-12 11:09:49.204 | NA | NA | NA |
| DATE OF BIRTH | ADMIN | SHARE DATA WITH THIRD PARTY | SEND NOTICE | ALLOWED | 2015-08-07 13:10:49.204 | NA | NA | NA |
| EMAIL | ADMIN | IMPROVE INTERNAL PRODUCTS & SERVICES | ASK CONSENT | ALLOWED | 2015-08-02 18:10:49.204 | NEXUS | 22 | NOT AVAILABLE |

FIG. 8D

DATA PRIVACY MANAGEMENT

CROSS REFERENCE TO RELATED APPLICATIONS AND PRIORITY

The present invention claims priority to Indian provisional specification (Title: System and method for managing privacy of personal data) No. 3559/MUM/2014, filed in India on Nov. 11, 2014.

TECHNICAL FIELD

The present subject matter relates, in general, to data privacy management and, in particular, to providing method and systems for managing sensitive data available to various organizations and/or institutions.

BACKGROUND

Currently, with advancement in the internet technology, various products and services have been introduced and practiced. Examples of such products and/or services include, but are not limited to, online transactions, social networking, e-commerce shopping websites, and so on. Such online products and services allow users to conveniently transact online. Various organization providing such products and services includes banks, telecom operators, insurance companies, and other such organizations.

The organizations enabling online provisioning of services and product to consumers acquires sensitive data of customers while the customers register with said organizations or accepts the services thereof. Such sensitive data may include, but are not limited to, name, address, date of birth, identity number, financial details like bank account details, credit card number, Card Verification Value (CVV) code, date of expiry of the credit card, and so on. The sensitive data of the customers that is available to the organizations may pose a risk of getting shared with other companies or third parties.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a method and system for managing privacy of data. In one aspect, a computer-implemented method for managing data privacy is provided. The method includes causing generation of a trigger notification of an access to at least one of a plurality of fields in a first application. The trigger notification is generated by a second application that is integrated with the first application. The first application includes the plurality of fields having sensitive data. The method further includes enforcing one or more access preferences corresponding to the at least one of the plurality of fields by the second application on the generation of the trigger notification. The one or more access preferences may be based at least on one of a plurality of preconfigured rules and contextual information associated with the trigger notification. Enforcing the one or more access preferences facilitates in managing data privacy.

In another aspect, computer-implemented system for managing privacy of data is provided. The system includes at least one memory; and at least one processor, the at least one memory coupled to the at least one processor wherein the at least one processor is capable of executing programmed instructions stored in the at least one memory to cause generation of a trigger notification of an access to at least one of a plurality of fields in a first application. The trigger notification is generated by a second application that is integrated with the first application. The first application includes the plurality of fields having sensitive data. The one or more access preferences corresponding to the at least one of the plurality of fields are enforced by the second application on the generation of the trigger notification. The one or more access preferences may be based at least on one of a plurality of preconfigured rules and contextual information associated with the trigger notification. Enforcing the one or more access preferences facilitates in managing data privacy.

In yet another aspect, a non-transitory computer-readable medium having embodied thereon a computer program for executing a method for managing data privacy is provided. The method includes causing generation of a trigger notification of an access to at least one of a plurality of fields in a first application. The trigger notification is generated by a second application that is integrated with the first application. The first application includes the plurality of fields having sensitive data. The method further includes enforcing one or more access preferences corresponding to the at least one of the plurality of fields by the second application on the generation of the trigger notification. The one or more access preferences may be based at least on one of a plurality of preconfigured rules and contextual information associated with the trigger notification. Enforcing the one or more access preferences facilitates in managing data privacy.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the drawings to reference like features and modules.

FIGS. 6A-6B illustrates a plurality of fields of sensitive data and preference settings for said field, in accordance with an example embodiment;

FIGS. 7A and 7B illustrate example UI for masking and unmasking, respectively, of the sensitive data of a user by a data privacy management system;

FIGS. 8A-8D illustrate example representations of reports generated by data privacy management system are illustrated.

Figure 1:
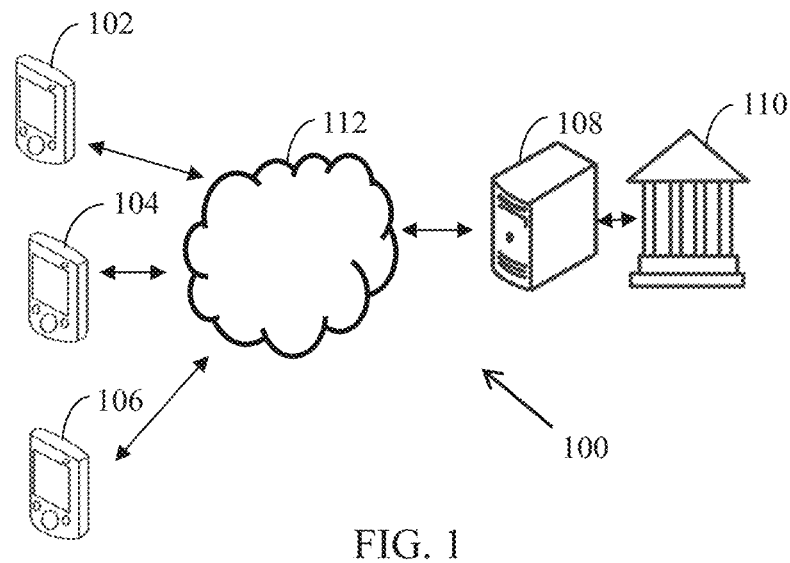
FIG. 1 illustrates example architecture for managing data privacy, in accordance with an example embodiment.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

The present disclosure relates to methods and systems for managing privacy of data in organizations and/or enterprises. The methods and systems are not limited to the specific embodiments described herein. In addition, the method and system can be practiced independently and separately from other modules and methods described herein. Each device element/module and method can be used in combination with other elements/modules and other methods.

Unless specifically stated otherwise as apparent from the following discussions, it is to be appreciated that throughout the present disclosure, discussions utilizing terms such as "determining" or "generating" or "comparing" or the like, refer to the action and processes of a computer system, or similar electronic activity detection device, that manipulates and transforms data represented as physical (electronic) quantities within the computer system's registers and memories into other data similarly represented as physical quantities within the computer system memories or registers or other such information storage, transmission or display devices.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Throughout the description and claims of this complete specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes and programs can be stored in a memory and executed by a processing unit.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The manner, in which the system and method for managing data privacy shall be implemented, has been explained in details with respect to the FIGS. 1 through 9B, while aspects of described methods and systems for managing data privacy can be implemented in any number of different systems, utility environments, and/or configurations, the embodiments are described in the context of the following exemplary system(s).

FIG. 1 illustrates example architecture 100 of managing data privacy, in accordance with an example embodiment. The embodiments are directed managing data privacy using an electronic device. The example architecture 100 is shown to include an organization or an institution 102 providing product or services, a computing device 104, a plurality of electronic devices such as devices 106, 108, 110, and communication network such as communication network 112.

In an embodiment, the communication network 112 may comprise any combination of Local Area Networks (LANs), Wide Area Networks (WANs), Internet Protocol (IP) networks, phone networks, Public Switched Telephone Networks (PSTN), wireless networks, cellular networks, Wi-Fi networks, Bluetooth networks, cable networks, data buses, or the like, or any combination thereof used for transferring information and/or data between the devices 106, 108, 110, the computing device 104, and the organization 102.

In an example embodiment, the electronic devices 106, 108, 110 may include a mobile device. Examples of a mobile device may include a mobile phone, a laptop, a sensitive digital assistant (PDA), a tablet, a workstation, and so on. In an embodiment, the electronic devices 106, 108, 110 belong to customers of organization 102, and may facilitate the customers of the organization 102 to access the products and/or services provided by the organization 110. For instance, the organization 102 may represent a bank, and the bank may provide services such as account opening, balance checking, online transfer, investments, bill pay options and numerous other services involving usage of internet for complete transactions. Herein, the customers of the electronic devices 106, 108, 110 may access the products and services provided by the institution by accessing an application of the institution on the electronic device (for example, electronic device (106, 108, 110) thereof. It will be understood that the customers may be provided an access to the organization 102 only upon being authenticated by the organization 102.

The organization 102 can authenticate the customers using customers' sensitive data that may be provided to the organization 102 by the customer at the time of registering with the organization. For instance, in case of availing of banking products and/or services, the customers provides various sensitive data including, but not limited to, permanent account number (PAN), date of birth, e-mail address, residential address, and contact details, and so on. The customers also provide various preferences to the bank such as interest in receiving information regarding various products offered by the bank. In case, a customer is using a credit card or a debit card issued by the bank, the bank may be able to view the spending pattern of the customer. The data pertaining to information such as spending patterns, account balance, loans, sensitive details and any other such data is customer's sensitive data, and is mostly available to the personnel employed at the bank.

Various embodiments of the present disclosure allow management of data privacy of the customers' data. The embodiments provide systems and methods for managing data privacy by integrating an application with the application of the organization. Said application may impose restrictions on access of the sensitive data of the customers by enabling the customers to define various access preferences. The access preferences can facilitate the customers in monitoring the access of sensitive data thereof by an intended user (for example, bank employees) or party (for example, a third party). In an embodiment, the system for managing data privacy (hereinafter referred to as "data privacy management system") can be implemented as an application on a computing device such as the computing device 104. The data privacy management system may include hardware and software that may be collectively configured to host an IT application for performing various functions pertaining to management of data privacy. In the foregoing discussion, said IT application for managing data privacy shall be termed as "second application". Accordingly, the terms "second application" and the data privacy management system can be used interchangeably throughout the description. The data privacy management system is explained further in detail with reference to FIGS. 2 and 3A-3B.

In an embodiment, the computing device 104 embodying the data privacy management system can be a server communicably coupled to the organization 102 (in particular, server of the organization 102). It may however be understood that the system 102 may also be implemented in a variety of computing systems, such as a laptop computer, a desktop computer, a notebook, a workstation, a mainframe computer, a server, a network server, and the like. In an embodiment, the computing device 104 may be one or more servers for example a farm of networked servers, a clustered server environment, or a cloud network of computing devices, that may be included in, or otherwise, in communication with the organization 102. In another embodiment, the computing device 104 may be a mobile electronic device capable of communicating with the organization 102, and implementing the system for managing data privacy of customers of the organization 102. In particular, the computing device 104 may include the data privacy management system for managing access to sensitive data of the organization by individuals not authorized to access said data. The computing device 104 (or the system 104 embodied in the computing device) may interact with the customers, and allow the customers to set preferences and save the preferences for various fields of information of the sensitive data. The computing device 104 may enforce the access preferences to the said fields, thereby managing data privacy of customer's data.

In an embodiment, the organization server 102 may receive a request for accessing the certain fields of sensitive data of the customer, and the organization server 102 may direct the request to the computing device 104. The computing device 104 may cause generation of a trigger notification for accessing certain fields of the sensitive data. The trigger notification may be evaluated based at least on the preferences preconfigured and/or contextual information for accessing said field of the sensitive data. Based on said evaluation the computing device 104 enforces the access preferences corresponding to said field. A system for managing access to sensitive data of the customers of the organization is described further with reference to FIG. 2.

Figure 2:
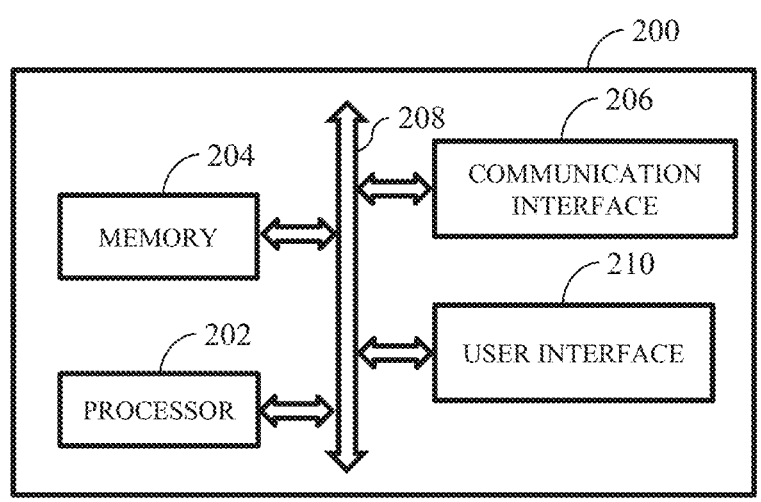
FIG. 2 illustrates a block diagram of a system for managing data privacy in accordance with an example embodiment.

FIG. 2 illustrates a block diagram of a system 200 for managing data privacy in accordance with an example embodiment. The system 200 may be caused to define and enforce privacy preferences applied to sensitive data of users/customers of an organization and/or institution. As discussed with reference to FIG. 1, the user can access a first application associated with the organization, for instance a financial account, so as to access the products and/or services offered by the organization. The organization may retrieve and/or store user's sensitive data so as to allow the user to access the products and/or services offered by the organization. The disclosed system 200 can cause integration of a second application with the first application for managing the privacy of the sensitive data that is shared with the organization. In an embodiment, the sensitive data may include data of a user's profile, for example, user's details such as financial details, personal details and so on. In some scenarios, the sensitive data may include data regarding enterprise policy, data defined as sensitive according to government regulations, and so on. For example, the documents such as leave policy of a company, health policy related documents, and other internal documents of a company may include sensitive data. In an embodiment, the second application can cause the system 200 to store the privacy preferences of the user for various fields of the first application, and enforce said preferences appropriately in real-time so as to manage the data privacy of the user. In an embodiment, the second application can be integrated with the first application by synchronizing the plurality of fields of the first application with the second application. In an embodiment, integrating the second application with the first application may include integrating a library in the first application, such that the library so as to enforce the preferences defined for access preferences.

In an example embodiment, the system 200 may be embodied in, or is in direct communication with a computing device, for example the computing device 104 (FIG. 1). The system 200 includes or is otherwise in communication with at least one processor such as a processor 202, at least one memory such as a memory 204, and a communication interface 206. The processor 202, memory 204, and the communication interface 206 may be coupled by a system bus such as a system bus 208 or a similar mechanism.

The at least one memory such as the memory 204, may store instructions, any number of pieces of information, and data, used by a computer system, for example the system 200 to implement the functions of the 200. The memory 204 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the system 200 to carry out various functions in accordance with various example embodiments. Additionally or alternatively, the memory 204 may be configured to store instructions which when executed by the processor 206 causes the system 200 to behave in a manner as described in various embodiments.

The at least one processor such as the processor 202 may be implemented as one or more microprocessors, microcomputers, microcontrollers, digital signal processors, central processing units, state machines, logic circuitries, and/or any devices that facilitates in managing access to a financial account. Further, the processor 202 may comprise a multi-core architecture. Among other capabilities, the processor 202 is configured to fetch and execute computer-readable instructions or modules stored in the memory 204. The processor 202 may include circuitry implementing, among others, audio and logic functions associated with the communication. For example, the processor 202 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 202 thus may also include the functionality to encode messages and/or data or information. The processor 202 may include, among other things, a clock, an arithmetic logic unit (ALU) and logic gates configured to support operation of the processor 202. Further, the processor 202 may include functionality to execute one or more software programs, which may be stored in the memory 204 or otherwise accessible to the processor 202.

The communication interface 206 is configured to facilitate communication between an organization (for example, the organization 102), the system 200 (or the computing device 104 embodying the system 200), and at least one electronic device (for example, the electronic devices 106, 108, and 110). The communication interface 206 may be in form of a wireless connection or a wired connection. Examples of wireless communication interface 206 may include, but are not limited to, IEEE 802.11 (Wifi), BLUETOOTH®, or a wide-area wireless connection. Example of wired communication interface 206 includes, but is not limited to Ethernet.

In an example embodiment, a user interface 210 may be in communication with the processor 202. Examples of the user interface 210 include but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 210 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 210, such as, for example, a speaker, ringer, microphone, display, and/or the like. The processor 202 and/or user interface circuitry comprising the processor 202 may be configured to control one or more functions of one or more elements of the user interface 210 through computer program instructions, for example, software and/or firmware, stored on a memory, for example, the at least one memory 204, and/or the like, accessible to the processor 202.

In an embodiment, the system 200 is caused to allow defining a plurality of preferences corresponding to plurality of fields of the first application, where the plurality of fields may include sensitive data associated with a user profile. The sensitive data may include personally identifiable information (PII) data and domain specific data. Herein, the PII data may refer to the data that may be utilized for determining identity of the user. Examples of fields including the PII data in case of a finance application may include PAN number, date of birth, e-mail address, residential address, and mobile number. The domain specific data includes the data that can pose a risk or affect the user financially or otherwise, if disclosed in public. In an embodiment, the domain specific data may include domain specific fields, and can be generated by the organization. Examples of said domain specific data for a financial institution such as a bank may include financial information such as debit and/or credit card numbers, CVV number, account balance, card expiry date, and other such fields.

In an embodiment, the system 200 may be caused to define the one or more access preferences for the sensitive data based at least on one of a plurality of preconfigured rules and contextual information. In an embodiment, the plurality of preconfigured rules may be defined based on a user input. Examples of access preferences that may be defined for accessing one or more fields of the sensitive data may include access-time preference and access-type preference. The access-type preference may include at least one of allowing an access to the one or more fields, denying an access, allowing access upon consent from the user, a notification generation upon access, and various other preferences. In an embodiment, the access-time preference may include defining preferred time to call, preferred date of communication, Do-Not-Disturb (DND) options, and other scheduled preferences. Herein, it will be understood that the above defined preferences are mentioned for example purposes and should not be considered as limiting to various embodiments of the disclosure.

The system 200 can allow configuration of various other preferences based on various other parameters and/or attributes of the organization and/or users. For instance, the preferences may be defined based on parameters including, but not limited to, time, date, geography, role, IP address, and so on. As an example, for a security related data field, authentication and authorization could be provided as a preference, meaning thereby that for accessing a security related data, the intended party may be required to provide authentication details, and once authenticated, the intended party is able to access said data. The system 200 may be caused to customize the preferences in accordance with the sensitivity of the sensitive data.

In an embodiment, the one or more fields of the first application may be accessed by an intended user/party. For example, an employee at the organization making an attempt to access a sensitive data of the user/customer of the organization by accessing the first application may be an "intended user/party". In response to access attempt, the system 200 may cause generation of a trigger notification notifying the attempt to one or more fields of the sensitive data in the first application. The trigger notification may be generated by the second application. The system 200 may evaluate the access preferences defined for the fields for which access attempt is made, and the contextual information associated with the trigger notification. In an embodiment, the system 200 may be caused to enforce the plurality of access preferences to access a field of the first application based on the access preferences defined for said field and the contextual information associated with the trigger notification. In various embodiments, the contextual information may include one or more of purpose of accessing the sensitive data associated with the fields, history (or user interest), offer provided to the user, role of the intended party who is trying to access the information, and so on.

In an embodiment, the system 200 may be caused to enforce the one or more access preferences corresponding to the one or more fields on the generation of the trigger notification. For instance, in case, for a field the access preference is defined as "ask consent," then the system 200 may be caused to enforce the access preference by communicating with the user for seeking the user's consent to allow access of the sensitive data of the field. The system 200 is additionally caused to include contextual information associated with the trigger notification in communication with the user. For instance, if the intended user wishes to access the PAN number of the user from the user profile, then the system 200 may prompt the intended user to provide contextual information defining the need to access the PAN number of the user. The intended user may provide the contextual information, for example, "Need to access the PAN number for verifying loan documents of the user". The contextual information provided by the intended user can be communicated to the user along with the notification, that the intended user is trying access the sensitive data associated with the field "PAN number". In response to the notification, the user may either deny the access request or may allow the access request. In case, the user replies to trigger notification generated by the system 200 with a positive response, the system 200 may enforce said preference and enable the unmasking of the data associated with the field, thereby allowing the intended user to access the PAN number. In another scenario, for instance in case of a negative response, the system 200 may enforce the preference of not allowing the intended user to view the PAN number, the system may continue to disable the unmasking of the data associated with the field, thereby restricting the intended user to access the sensitive data.

Herein it will be understood that the system 200 may be caused to disable the access of all the sensitive data, and may enable access based on the preference defined for respective fields of the sensitive data. In an embodiment, the system 200 may be caused to disable the access of the sensitive data by masking the data. For enabling the access, the system 200 may be caused to unmask the previously masked data based on the preferences defined for said data. For example, in an example embodiment, where the access preference for a field is defined as "always allow," the system 200 may be caused to unmask said field in the first application without user intervention to display the data associated with the field.

In case, the access preference for a field is defined as "always deny," the system 200 may be caused prevent unmasking of said field and may generate a notification to that effect. For example, the system 200 may generate a notification "You are not authorized to view the data". In an embodiment, where the access preference for a field is defined as "Generate notification upon access," the system 200 may be caused to allow access to the field by unmasking the data and simultaneously send a notification along with the contextual information informing the user regarding the access to the sensitive data and the contextual information citing the purpose of access. The masking and unmasking of the sensitive data dynamically is described in the US patent application having application number U.S. Ser. No. 14/066, 392 titled "Dynamic data masking" which is incorporated herein by reference in its entirety. An example UI for masking and unmasking of the sensitive data is described further with reference to FIGS. 7A and 7B.

In an embodiment, the system 200 may be caused to dynamically update the access preferences associated with the sensitive data. In an embodiment, the system 200 is caused to monitor user behaviour and user's responses pertaining to the preferences that are defined for the plurality of fields and user's behaviour while enforcing the access preference to dynamically update the access preferences. In an embodiment, based on a learning of the user behaviour, the system 200 may be caused to update one or more of the plurality of access preferences. For instance, an intended party may wish to access "Email address" field from the user profile stored in the first application. The interested party may provide the contextual information as "Need Email address to inform regarding a 60 percent discount on the purchase of a book". Based on the access request by the third party, a trigger notification may be generated. In response to the trigger notification, the system 200 may configure an access message. The access message may be of a format as mentioned below.

{Authenticated (boolean), Authorized (boolean), Role, Sensitive field, Purpose, Incentive, CID}

Herein, "Authenticated (boolean)" and "Authorized (Boolean)" fields of the access request may be used for checking an authenticity of the request. For instance, in the above mentioned scenario, the "Authenticated (boolean)" and "Authorized (Boolean)" fields may be indicative of the discount on the book, and the third party providing said discount, respectively. The "Role field" may indicate a role of the intended party wishing to access the sensitive data. "Sensitive field" may indicate a title of the sensitive data which is to be accessed. "Incentive field" may indicate an offer provided by an organization to the user. The "CID" field may denote a customer identity.

Further, the system 200 may access a preference history of the user and the current preferences defined by the user. In an embodiment, the 'preference history' may refer to the previous preferences indicated by the user over a time period. Particularly, the preference history may include user's responses to previous trigger notifications for same or similar fields and contextual information. The preference history may be stored in the memory 204 of the system 200. In an embodiment, the previous preferences may be generated during the previous interactions of the system 200 with the user, and said preferences may be stored in a log file. For instance, in this example, the preference defined for "Email address" field may be "Deny". However, based on the previous history of preference for the "Email address" field may indicate the preference as "Ask consent," meaning thereby recently the user has preferred to be asked for a consent prior to sharing of the email address instead of directly denying for access. The system 200 may be caused to analyse the access message, the previous preferences, current preferences, and the contextual information (or the purpose for the access), and communicate with the user even when the preferences for the field "Email id" are defined as "Always deny". For instance, the system 200 may communicate with the user based on the access message to provide information regarding the discount on the book, and seek user's consent for sharing the email address with the interested party. In this example, since the communication from the system 200 includes authentic message/discount (verified using "Authenticated (boolean)" and "Authorized (Boolean)" fields), the user may be willing to consider sharing of the email id as the request is authentic. In case the user provides consent, the system 200 may allow the access of the email address to the intended party. For instance, the system 200 may unmask the email address field of the user profile in the first application. In another embodiment, the system 200 may communicate the email address of the user profile through a suitable communication means such as a short service message, email, and the like. Alternatively, upon receiving a negative response from the user the system 200 may be caused to prevent the access of the address information.

In an embodiment, the system 200 may be caused to analyse the previously defined preferences by the user over a time period. The system 200 may store the details of access of the sensitive data by intended parties, details of denial for access to the access of the sensitive data by the intended parties, and number of times the requests for accessing the sensitive data was initiated, and other such information that may be utilized for analysing user behaviour over a period of time. Said details may be stored in the log file in the memory 204. The system 200 may be caused to determine an extent of exposure of the sensitive data to the intended parties corresponding to the one or more fields on enforcing the one or more access preferences over the time period.

In an embodiment, the system may be caused to provide a comparison of the extent of exposure of the preferences corresponding to the sensitive data of a plurality of profiles. For instance, the system 200 may generate reports representing the exposure of PAN number of a user vis-à-vis an average exposure of PAN numbers of other customers of the organization over a period of say one month. Such reports may provide a comparison of exposure of user's sensitive data with the sensitive data of other customers. In some embodiments, the reports may be generated in form of graphs and charts for convenient visualization.

The system 200 may monitor the domain specific data from the sensitive information of the user profile to identify the number of attempts made by intended party for accessing the said data. Monitoring the sensitive fields may enable the user in identifying/detecting a suspicious activity or fraud or a potential threat to his sensitive data stored in the system 200. In an embodiment, the system 200 may be caused to generate reports that may be utilized by the customers to track any event of fraud detection. For example, the reports generated by the system 200 may also show that the extent of exposure of the user's sensitive data that is accessed by the intended parties over a period of time and checks identify the information that is already been exposed of a given user. Exposure of some pieces of information such as CVV, Credit card number and Expiry date to the same intended party may pose a potential threat. In an embodiment, the system 200 is caused to compute a data exposure value which is indicative of extent exposure of the sensitive data of a user (hereinafter referred to as user's data exposure value). The system 200 may compare the user's data exposure value with a threshold value of data exposure, and on determination of the user's data exposure value being greater than or equal to the user's value of data exposure, the system 200 may cause generation of an alert notification. The alert notification may notify the user regarding the exposure of user's sensitive data as said exposure may be an indication of a potential fraud. It will be noted that the user's data exposure value and the threshold data exposure value can be computed by using machine learning algorithms. An example method for computing the threshold data exposure value is provided below.

In an embodiment, the system 200 may be caused to compute the exposure value by assigning weightage to each of the fields of the sensitive data. In an embodiment, certain fields of the sensitive data may be given more weightage than others. For example, sharing of e-mail id may not lead to theft as compare to sharing the credit card related information, and accordingly the more weightage may be given to the credit card information as compared to the email id. Additionally or alternatively, the system 200 may compute the weightage based on access information indicative of the 'role' of the intended party (or third party or user) that is accessing the sensitive information, time of access, frequency of access, and so on. In an embodiment, the system 200 can derive said access information from the activity logs or history of access (over a time period) stored in the memory 204 of the system 200. The system 200 may further be caused to compute feature vectors from the access information and the weightage assigned to the fields of the sensitive data. In an embodiment, the feature vectors may include multiple dimensions such that each field of the sensitive data is represented as a dimension of the feature vector. In another embodiment, the system 200 may combine two or more fields of the sensitive data to represent a dimension of the feature vector. In an embodiment, the system 200 may assign weightage to the fields or combinations of fields in the feature vectors based on an extent of sensitivity of the sensitive data. Once the feature vectors are computed, a supervised machine learning algorithm can be applied to the feature vectors so as to identify the fraudulent behaviour/activity.

Herein, it will be noted that a value of data exposure beyond the threshold value of the data exposure may be indicative of a fraud. For example, the threshold value of the data exposure can indicate a scenario where the user's sensitive data is accessed more than an acceptable number of times. In another scenario, the threshold value of data exposure can indicate the specific fields which are accessed by a particular person or intended party more than a threshold number of times. In yet another embodiment, the threshold value can be indicative of a difference between the data exposure of the user and average data exposure of other users' of an organization/institution. In still another embodiment, the threshold value can be indicative of a combination of above mentioned factors such as, sensitive data being accessed more than an acceptable number of times, specific fields which are accessed by a particular person or intended party more than a threshold number of times, difference between the data exposure of the user and average data exposure of other users' more than an acceptable values, and so on. It will be understood threshold value can be interpreted in different scenarios differently without limiting the scope of various embodiments of the disclosure.

Figure 3A:
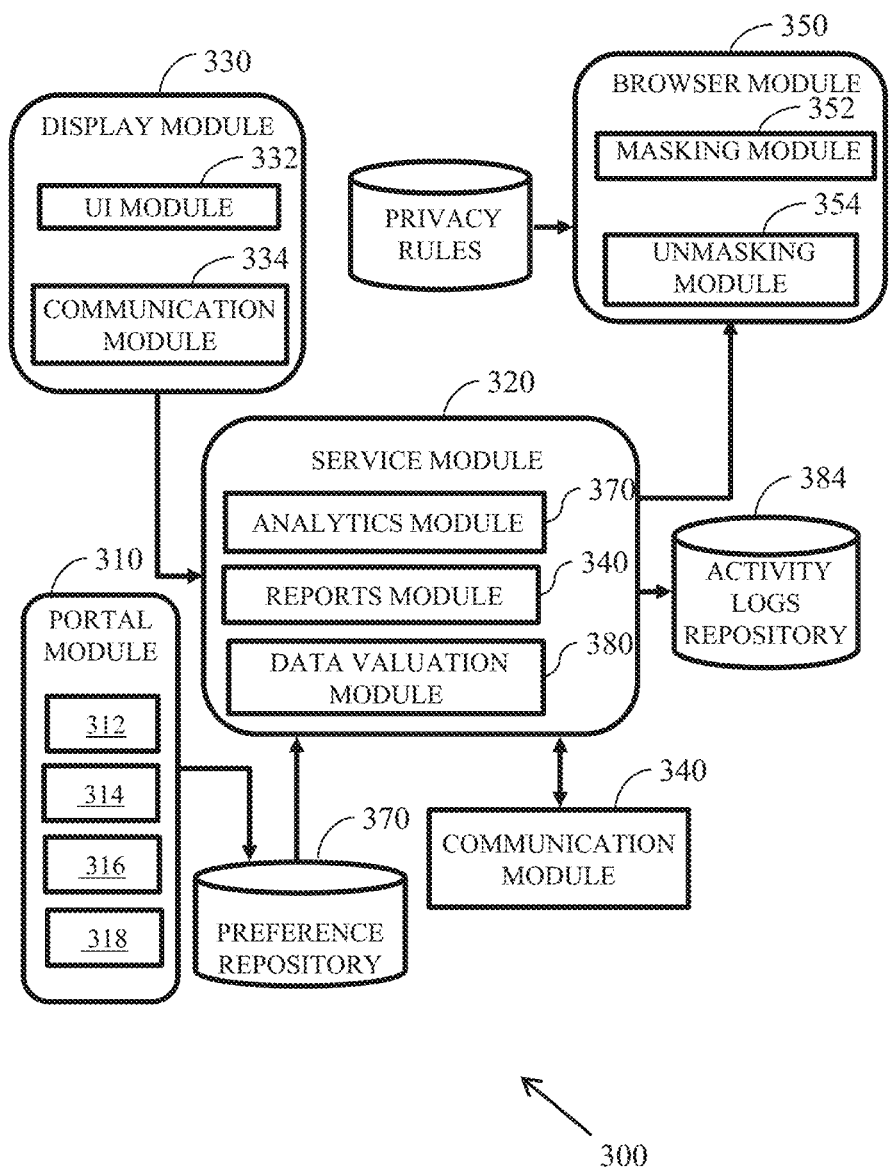
FIG. 3A is example system architecture for managing data privacy in accordance with an example embodiment.

FIG. 3A is example system architecture 300 for managing data privacy in accordance with an example embodiment. The system architecture 300 is configured to implement and enforce various access preferences pertaining to sensitive data of users (or customers of an organization), thereby facilitating increase in transperency between the organization and the customers. The system architecture 300 is example architecture for a data privacy management system such as the system 200. The system 300 is configured to embody the second application, and implement various functionalities thereof. As described with reference to FIG. 2, the system 200 includes the memory 202 that may store a plurality of modules and/or instructions for performing a variety of functions to manage data privacy. The modules include routines, programs, objects, components, data structures, etc., which perform particular tasks or implement particular abstract data types.

The system architecture 300 which represents an example implementation of the system 200 may include a portal module 310, a service module 320, a display module 330, a communication module 340, and a browser module 350. The modules may serve purposes of interacting with a user, setting preferences for sensitive data of the user, monitoring activities related to the sensitive data, and generating reports of the monitored activities.

The portal module 310 includes a preference manager module 312, a reports module 314, a registration module 316 and an authentication module 318. The preference manager module 312 allows users/customers of the organization to manage access preferences thereof corresponding the plurality of fields of the first application (i.e. the application of the organization). The plurality of fields may include, in addition to other fields, sensitive data. The sensitive data may include PII data and domain specific data. The PII data may refer to the data which is of sensitive nature, and if exposed outside may pose risk, financially or otherwise, to the user. The preference manager module 312 may allow defining access preferences for accessing the plurality of fields of the user-profile. Examples of the access preferences may include always allow to access, notice, ask for a consent, always deny, and so on. In certain embodiments, the preferences may be defined to include time and date to suit users' working/busy and idle hours. It will be noted that without limiting to preferences defined here, the preference manager module 312 may allow defining a plurality of various other preferences in alignment with other embodiments of the present disclosure.

The registration module 316 is configured to accept profile information such as username, display name, password, mobile number, and other such information that may facilitate in registering the user/customer on to the second application. The system 300 may be caused to verify the registration of the user through a communication mode, for instance, e-mail, short messaging service (SMS), and so on.

The authentication module 318 may facilitate in authenticating the users/customers based on credentials thereof. For instance, in case a user attempts to access the second application, the authentication module may prompt the user to provide user credentials, and on authentication successful of the user by the authentication module 318, the users may be allowed to access the second application. The user may access the second application for defining preferences thereof using a UI of the system 300. Example of the UI may be UI 210 of the system 200. In an embodiment, the UI of the system 300 may populate a plurality of field relevant to the first application. The plurality of fields may include PII fields and sensitive field. Herein, the PII fields may refer to the fields that may be utilized for determining identity of the user. Examples of such fields in case of a banking application may include PAN number, date of birth, e-mail address, residential address, and mobile number. The sensitive field that may include sensitive data associated with the customer, and making said sensitive data public may pose a risk for the customer. In an embodiment, the sensitive fields may be domain specific fields, and can be generated by the organization. Examples of said sensitive data may include financial information such as debit and/or credit card numbers, CVV number, account balance, card expiry date, and other such fields. In an embodiment, the preference manager module 312 may further facilitate in defining access preferences such as Do Not Disturb (DND), scheduled preferences and various other preferences. In an embodiment, the preferences may be stored in a preference repository 360. For instance, once the access preferences are defined, the access preferences can be submitted in the JSON form to NoSQL DB (Cauch DB). Alternatively, the access preferences can also be stored in XML, CSV or in any other relational database.

The display module 330 may incorporate a UI module 332 and a communication module 334 of the second application to handle communication from the service module 320. The display module 330 may be coupled with a communication module of a user's/customer's electronic device. The display module 330 may enable a user to provide preferences such as approval or consent, on being queried by the system. For example, if user has set 'Ask consent' preference for PAN number and an intended party such as a bank employee tries to view user's data using 'Viewing console' then the system 300 may cause the display module 330 to send message to the user (through a communication means) and approval can be obtained from the user. In case of negative response, bank employee cannot view the sensitive data such as PAN number of the user. The display module 330 may also facilitate in enabling the user to access/view privacy statement associated with the user's profile. The privacy statement may be a collection of records describing who has viewed user's PII fields and domain specific fields, when, for what purpose and whether approval was given for same or not.

The communication module 340 enables the display module 330 to communicate with the user's device. The communication module 340 may include communication components such as SMS messaging component and Internet messaging component for enabling communication the using various means. For instance, the communication module 340 may include an SMS component that may utilize SMS service to notify and/or receive approval from user for PII and domain specific fields. The communication module 340 may include an internet messaging component that may send messages to display module 330 using the internet. In an embodiment, the Internet messaging component sends messages to the second application installed in the user's electronic device using the internet. Standard HTTP or HTTPS requests and responses can be used for such communication. For sending push notifications to the second application, publish-subscribe architecture may be utilized. The publish-subscribe architecture may include subscribing to a topic unique topics, and receiving notifications published on said topic. The publish-subscribe architecture supports same user using multiple devices, because any number of devices can be subscribed to the same topic and the notifications are sent at multiple devices embodying the second application. An implementation example of publish-subscribe model is MQ Telemetry Transport (MQTT). Alternatively, messages can also be sent by emails/other protocols/services (such as web service) or by any other means of communication.

The service module 320 may facilitate in arbitration between the user (user's electronic device) and the intended user/party who may try to access user's sensitive data. Whenever the intended party tries to view user's sensitive data using a viewing console, a trigger notification may be generated and sent to the service module 320. The service module 320 retrieves user's preferences from a preference store/repository 360. The preference store may store the current preferences of the user's regarding the PII and domain specific fields, and may be coupled to the service module 320. The service module 320 may further identify the data that is being accessed and user's preference for that type of data. If that data requires user's approval before request can be granted to the intended party accessing user's data, the service module 320 may send message to the user. The message may be sent through Internet, SMS, or any other mode of communication depending on the availability of service. Upon receipt of request from the service module 320, the user may grant or deny to the request by replying to message positively or negatively. If response from the user is positive then the service module 320 may provide positive response back to the browser module 350 of the system, else a negative response can be sent. Depending on the type of response the browser module 350 may retain mask or unmask the data from the intended party. In an embodiment, the browser module 350 may include a masking module 352 and an unmasking module 354 for masking and unmasking, respectively the data. In certain embodiment, where the preferences stored as 'Always allow' or 'Always deny,' the service module 320 may not send any communication but user may see the attempt of access to his/her data in the privacy statement.

The browser module 350 may facilitate the user in viewing the sensitive data associated with the user's profile. The browser module 350 may be implemented by any browser such as IE, Mozilla firefox, Opera or standalone software system or any service (without UI but may use command line). The browser module 350 may be capable to query the service module 320 and also process the response coming from the service module 320.

The service module 320 may include an analytics module 370 and a reports module 380. The analytics module 370 may be capable of performing analysis of the preferences as well as enforcement of the preferences over a period of time. For instance, the analytics module 370 may be capable of performing a preferences analysis, decision analysis, request-response analysis, and fraud detection analysis. In an embodiment, the analytics module 370 may include a plurality of modules for performing a preferences analysis, decision analysis, request-response analysis, and fraud detection analysis, as illustrated in FIG. 3B.

Figure 3B:
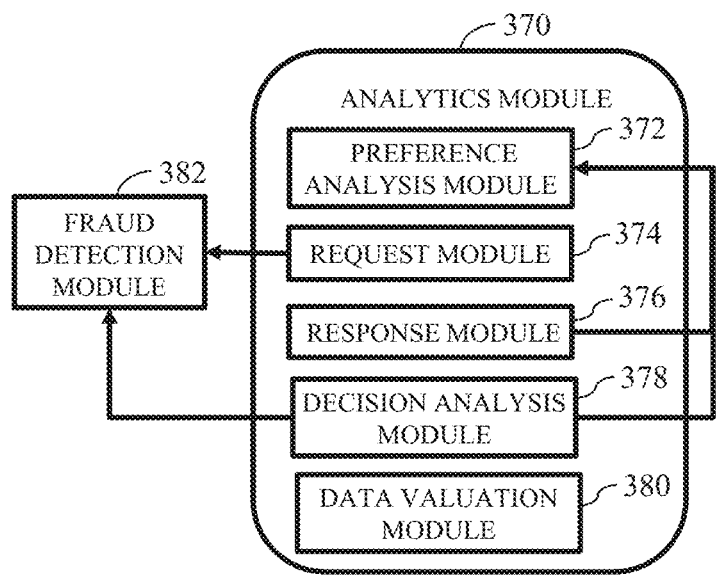
FIG. 3B is example block diagram of an analytics module for managing data privacy in accordance with an example embodiment.

Referring to FIG. 3B, the analytics module 370 includes a preference analysis module 372, a request module 374 and a response module 376 for performing request response analysis, and a decision analysis module 378. The preference analysis module 372 may analyze how the preferences of users changes over the time period. The Request module and the Response module may be capable of analyzing how many of requests required consent, how many of them are of notice, how many of them were of allow or deny, and other such analytics. The request module 374 and the response module 376 may check when the request was sent to user for approval and when the reply was received. The request module 374 and the response module 376 further helps in determining the time-out in normal circumstances, for instance, in exceptional circumstances, when the users may be busy attending any meeting or doing urgent work. In an embodiment, the feedback from the request module 374 and response module 376 is provided to the preference analysis module 372, as illustrated in FIG. 3B. The decision analysis module 378 is capable of taking decisions based on the feedback received from the request module 374 and response module 376. The reports module 380 is capable of generating the reports based on analytics performed by the preference analysis module 372, the request module 374 and the response module 376, and the decision analysis module 378.

In an embodiment, the system 300 may include a data valuation module 380. The data valuation module 380 may enable the organization to figure out how much value customers are willing to put on their data. In an embodiment, the data valuation module 380 may be embodied in the analytics module 370. In an embodiment, the data valuation module 380 may perform the data valuation of the sensitive information by classifying the contexts/purposes behind access to data into commercial and non-commercial activities. The commercial activities may include discount on products, marketing, analytics, and so on. The non-commercial activities may include sending notification, investigation, and so on. The data valuation module 380 may give fixed value or variable value to each commercial activity. The sensitive information may fall under more than one commercial activities, and thus same information may assume different values. Classification of activities into commercial or non-commercial can be done by machine learning algorithms.

The fraud detection analytics can be performed by a fraud detection module 382. The fraud detection module 382 is coupled with the analytics module 370 and is capable of analyzing the behavior of intended parties over a period of time to check how much sensitive information of a given user has already been exposed. Exposure of some pieces of information such as CVV, Credit card number and Expiry date to same person poses a potential threat.

The report module 340 may facilitate the customers and/or users of the organizations/institution to access the sensitive data exposure through various reports, such as the privacy statement. The report module 340 may further compare the data exposure of sensitive data of their user-profile with other user-profiles (or the customers) of the same organization through various charts and graphs. The presentation of the reports through charts and graphs are described further with reference to FIG. 8A-8D.

In an embodiment, details of access of the sensitive data by intended parties, details of denial for access to the access of the sensitive data by the intended parties, and number of times the requests for accessing the sensitive data was initiated, and other such information that may be utilized for analysing user behaviour over a period of time. Said details may be stored in log files in activity logs repository 384.

Figure 4:
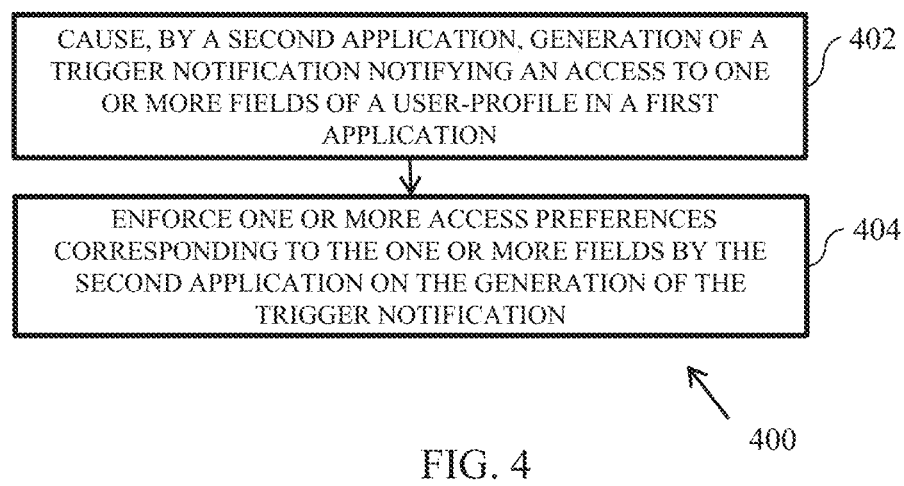
FIG. 4 is a flow diagram depicting an example method for managing data privacy, in accordance with an example embodiment.

FIG. 4 is a flow diagram depicting an example method 400 for managing data privacy, in accordance with an example embodiment. The method 400 depicted in the flow chart may be executed by a system, for example, the system 200 of FIG. 2. In an example embodiment, the system 200 may be embodied in a computing device, for example, the computing device 108 (FIG. 1).

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 400 are described with help of system 200/300. However, the operations of the method 400 can be described and/or practiced by using any other system.

At 402, the method includes causing generation of a trigger notification notifying an access to one or more fields in a first application. Herein, the trigger notification may be generated by a second application integrated with the first application. As discussed with reference to FIGS. 2 and 3A-3B, the first application includes a plurality of fields having sensitive data associated with the user-profile. In an embodiment, the second application may be integrated with the first application to configure access preferences corresponding to the plurality of fields.

At 404, the method includes enforcing one or more access preferences corresponding to the one or more fields by the second application on the generation of the trigger notification. The one or more access preferences may be enforced based at least on one of a plurality of preconfigured rules and a contextual information associated with the trigger notification. Herein, the contextual information may include one or more of purpose of accessing the sensitive data associated with the fields, history (or user interest), offer provided to the user, role of the intended party who is trying to access the information, and so on.

In an embodiment, enforcing the one or more preferences corresponding to the one or more preferences may include asking for the consent, allowing the access, denying the access, providing a notification on access, and the like. In an embodiment, where the preference setting includes communicating with the user for seeking the user's consent in response to the trigger notification, a message along with the contextual information may be sent to the user. The user may review the contextual information, and may respond accordingly in real-time. For instance, the user may allow an access or may deny the access to the sensitive data. The system may accordingly enforce the preference, and may allow or deny the access respectively.

Figure 5:
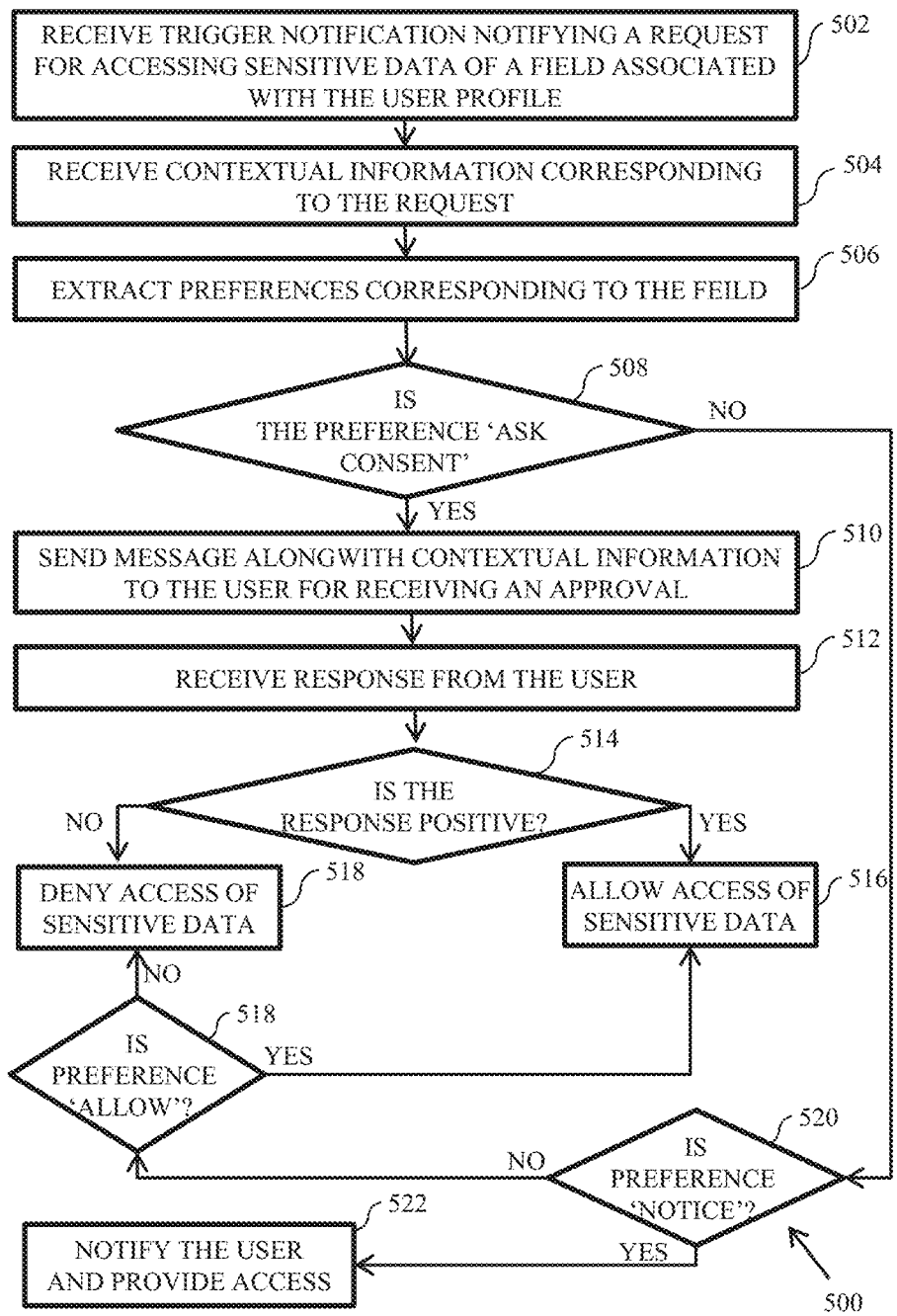
FIG. 5 illustrates flow diagram depicting an example method for managing data privacy, in accordance with another example embodiment.

FIG. 5 illustrates flow diagram depicting an example method 500 for managing privacy of data, in accordance with an example embodiment. At 502, a trigger notification notifying a request for accessing sensitive data of a field of a user profile may be received by a system, for example, the system 200 (FIG. 2) or the system 300 (FIG. 3A-3B). The request may be initiated by an interested person (or an intended person/party) who wishes to access sensitive data of the user.

At 504, contextual information corresponding to the request may be received. In an embodiment, the contextual information may include purpose of accessing the request. In an embodiment, the contextual information may be received at the system 200. At 506, in response to the trigger notification, the preferences corresponding to the request may be extracted by the system 200. The system 200 may extract the preferences for determining whether to allow or to deny the access to the sensitive data. At 508, the system 200 may check if the preference for the data to be accessed by the interested person is set as 'ask consent'. In case the preference is set as ask consent, the system 200 may send message along with the contextual information to the user for obtaining an approval for the access to sensitive data, at 510. As discussed with reference to FIG. 3, a communication module may enable the system 200 to communicate with the user. The system 200 may also communicate to the user of purpose of the access or the contextual information to the sensitive data. The system 200 may communicate with the user via a Short Message Service (SMS), an e-mail or any other known technique used for communication. The system 200 may use Message Queue Telemetry Transport (MQTT) protocol for communicating with the user over internet.

Post communicating with the user, the system may receive a response from the user at 512. At 514, the system 200 may determine whether the response from the user is positive. In case the response from the user is positive, the system may provide an access of the sensitive data of the user to the intended party, at 516. Whereas, if the response from the user is not positive at 514, the system 200 may deny an access of the sensitive data of the user to the intended party, at 518. As illustrated in FIG. 5, the process flow may move on to step 520 while the preference is not set as consent. At 520, the system may check if the preference for the data to be accessed by the intended party is set as notice. In case the preference is set as notice, the system may notify the user of access to sensitive data of the user, at 522. Post notifying the user, the system may provide an access of the sensitive data of the user to the interested person. In case the preference is not set as notice, the system may determine whether the preference for the data to be accessed by the intended party is set as 'allow'. In case the preference is set as allow, the system provide an access of the sensitive data of the user to the intended party at 516. Further, the system 200 may not notify the user about the access of the sensitive data while the preference is set as allow. In case the preference is not set as allow, the system may deny the access of the sensitive data of the user to the interested person, at 518.

FIGS. 6A-6B illustrates a plurality of fields of sensitive data and preference settings for said field, in accordance with an example embodiment. As discussed with reference to FIG. 3, the preference assignment module may allow the user to set preferences for PII fields. In a case, as shown in FIG. 6A-6B, the PII fields may comprise PAN number, date of birth, e-mail address, residential address, and mobile number. Further, preferences like Do Not Disturb (DND), scheduled preferences and other preferences, as thought by a person skilled in the art, may be set by the user using the system.

As discussed previously, the preference assignment module may also allow the user to set preferences for sensitive fields of information. The sensitive fields of information are domain specific and are generated by an organization such as a bank. The sensitive fields of information may comprise debit card number, CVV number, total balance, and debit card expiry date. The preference assignment module may allow the user to set the preferences as one of always allow, send notice, ask consent, or always deny. The preference assignment module may allow the user to assign priorities for the data while there is an internal usage of the data and an third party usage of the data. In an embodiment, the user may define different preferences for different types of accesses. For instance, for accesses pertaining to internal usage by an organization, the user may define different types of preferences as illustrated in FIG. 6A, however, for usage by a third party different access preferences may be defines, as illustrated in FIG. 6B. The access preferences defined by the user may be stored in a NoSQL database. The preferences may be stored by the system in an Extensible Markup Language (XML), JavaScript Object Notation (JSON), and a Comma-Separated Values (CSV) format. The data of the user may be masked for maintaining a privacy of the data.

FIGS. 7A and 7B illustrate example UI 710 for masking and unmasking, respectively, of the sensitive data of a user by a data privacy management system, for example, the system 200/300. In accordance with an example embodiment. As illustrated in FIG. 7A, the UI 710 having the sensitive data of a user (for example, a customer of a financial institution) is presented. Said sensitive information is shown to include user's email id, date of birth, contact number, complete mailing address, PAN number, credit card information, and so on. Said sensitive information may be accrued by the financial institution or may be provided by the customer to the financial institution while opening an account with the financial institution, or while availing any of the products or services offered by the financial institution. As such the financial institution may wish to utilize this information for any purpose, such as for marketing purposes, for sharing with third party, to improve their own services, and any other purpose. In certain scenarios providing a customer's sensitive information to a third party or using it for any other purpose without customer's consent can be undesirable by the customer. The disclosed system (for example, the system 200/300) enables a second application that can be integrated with a first application of an organization/institution (for example, the financial institution) that disables the access of the sensitive data to the organization/institution. The second application ensures that the organization/institution can access the sensitive data based on the preferences defined for accessing said data, and also disables the access unless the preference for accessing any of the fields of the sensitive data is defined otherwise.

In an embodiment, the sensitive information in the UI 710 is presented as masked information so as to disable the access of the sensitive data. The data in the fields is email id, date of birth, mobile number, address, PAN number, card number, card expiry date, and other such information as presented as masked. In case, an intended party for example a bank employee wishes to access the sensitive data in any of the masked field, the bank employee may click on said field. For example, referring to FIG. 7B, the bank employee may wish to access the email id of the customer. On clicking the email id field, the second application may open a window 752 in the UI 710 prompting the intended party to provide at least a part of contextual information for accessing the sensitive data. The contextual information include purpose for accessing the data, identification of the intended party trying to access the sensitive data, history (or user/customer interest), offers (if any) provided to the customer, role of the intended party who is trying to access the information, and other such information that may enable authentication of the intended party and define the usage of the sensitive data that is being accessed. In the present example, the window 752 illustrates the contextual information to include the intended purpose for accessing the data. For example, the window 752 includes predefined fields such as "To share data with third parties" and "To improve internal product and services" as the part of contextual information. The window 752 also includes a remarks section that can be utilized by the intended parties to provide further explanation of the intent of accessing the sensitive data. It will be noted that the example of the contextual information provided herein is for the purpose of explanation only, and is not intended to limit the scope of various embodiments. The contextual information can include different types of information, and the second application can be utilized to customize the UI to include conceptual information relevant to the first application. For instance, the sensitive data for an enterprise may include data pertaining to confidential policies, company's shareholders' information, board of directors' information or any such information which has a potential of being categorized as confidential. Similarly, for a research lab, the sensitive data may include the technologies on which the research team may be working currently, various innovations being processed at the research lab, the researchers associated with the every technological innovation, and so on. The UI 710 of the second application may enable the system 200/300 to customize the conceptual information in accordance with the organization/context of access.

In an embodiment, the system is caused to determine an extent of exposure of the sensitive data corresponding to the one or more fields on enforcing the one or more access preferences over a time period. In some embodiments, the system may generate reports to visually represent the extent of exposure of the sensitive data and a comparison of the exposure of sensitive data of a customer with that of other customers of the organization. Some examples of the reports that can be generated by the system are illustrated and described further with reference to FIGS. 8A-8D.

Figure 8A:
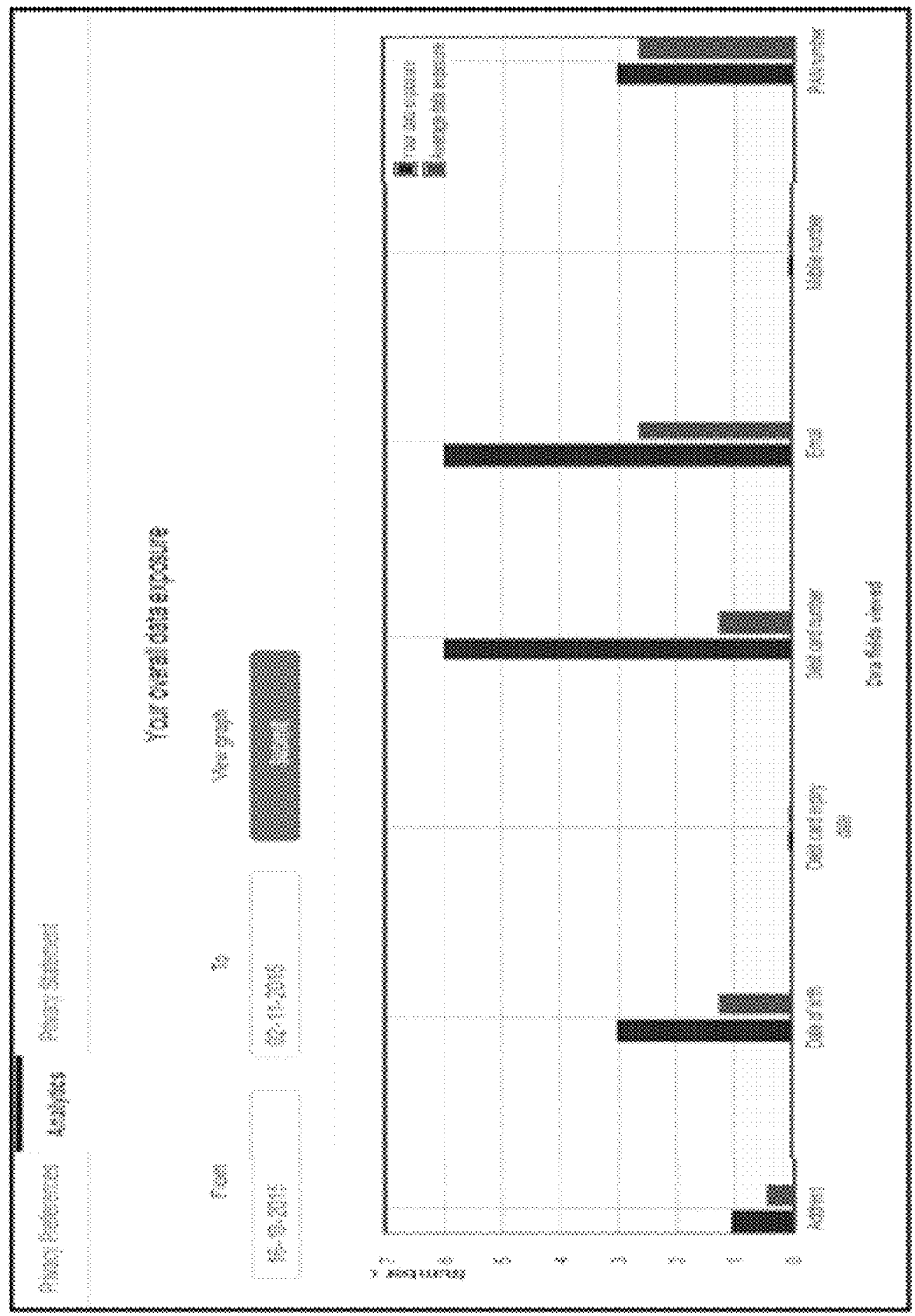

Referring now to FIGS. 8A-8D, representations of reports indicating exposure of sensitive data of a customer are illustrated. For example, FIG. 8A illustrates the sensitive data exposure of the customer and average sensitive data exposure for other customers of the same organization/institution. The fields having the sensitive data are considered as address, date of birth, debit card expiry date, debit card number, email, mobile number, and PAN number. The system is caused to determine exposure of sensitive data pertaining to said fields for the customer and the average sensitive data exposure for other customers, and present a comparison as in FIG. 8A. As illustrated in FIG. 8A, the analysis indicates that the data exposure of the sensitive data of the customer for the debit card number and the email id are substantially higher than average data exposure of other customers for the same fields. In some embodiments the system may also be caused to notify the customer (for example, by ways of a notification or an alarm) that the data exposure of the customer for one or more fields has reached a threshold. Herein, the term 'data exposure' refers to extent of accessing the data pertaining to the sensitive data. The data can be exposed when it is accessed by an intended party for any purpose. The intended party may try to retrieve the data from the customer over a period of time, say over one months' time period, so that the data exposure may not be noticeable. However, the report as presented in FIG. 8A can facilitate in bringing it to customer's notice the extent of exposure of customer's data over the time period, and also the comparison of the extent of exposure vis-à-vis other customers.

Figure 8B:
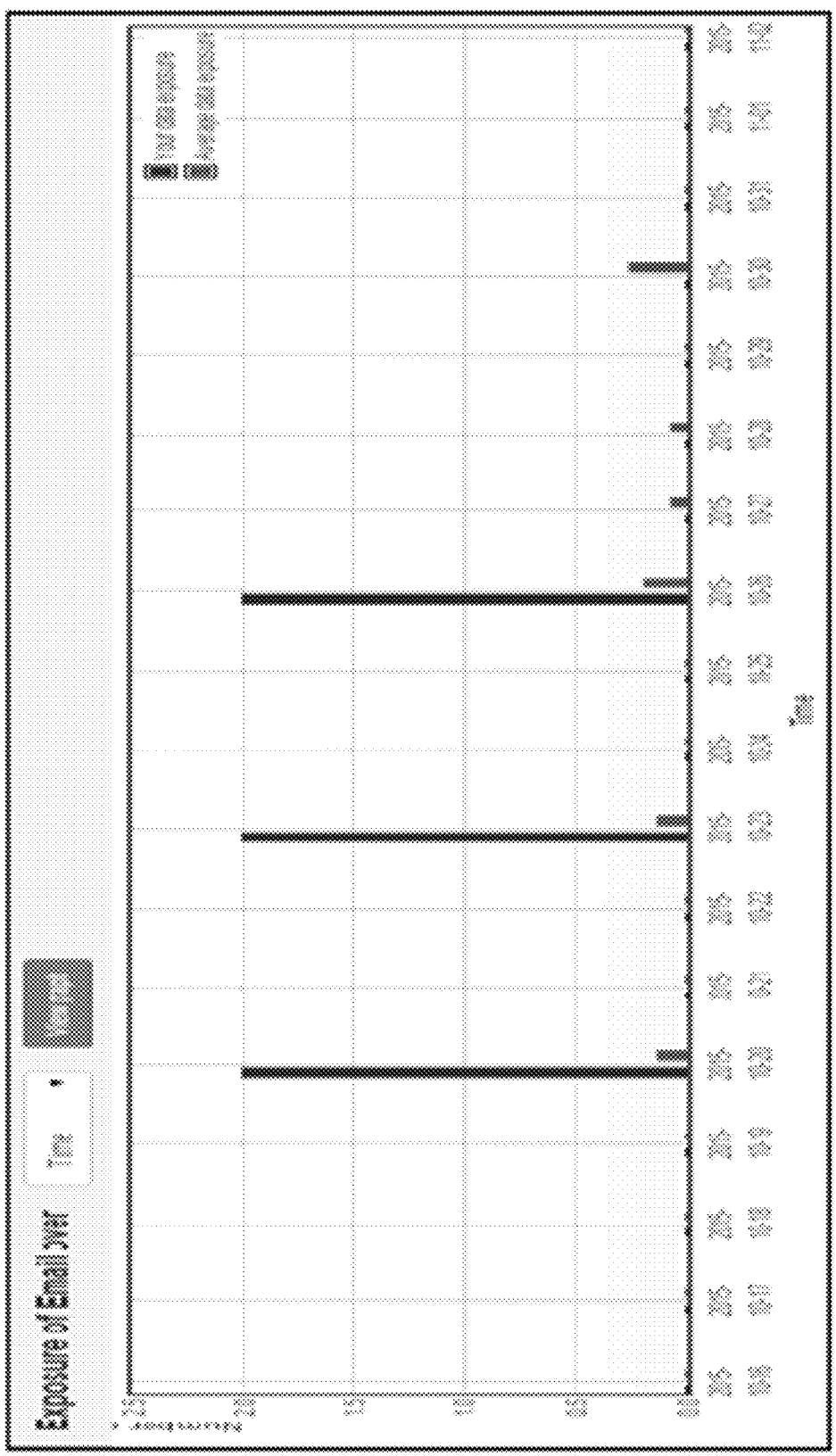

In an embodiment, the system can further provide detailed analysis of the mode of exposure of the customer's data over the time period. For example, FIGS. 8B and 8C detailed reports indicating exposure of customer data over email for the time period, and the intent/purpose of exposure, respectively. Referring to FIG. 8B, time-wise (for example, date-wise) exposure of the customer's email id is presented. Also, a comparison of the exposure of the sensitive data pertaining to said fields for the customer and the average sensitive data exposure for other customers is presented in FIG. 8B.

Figure 8C:
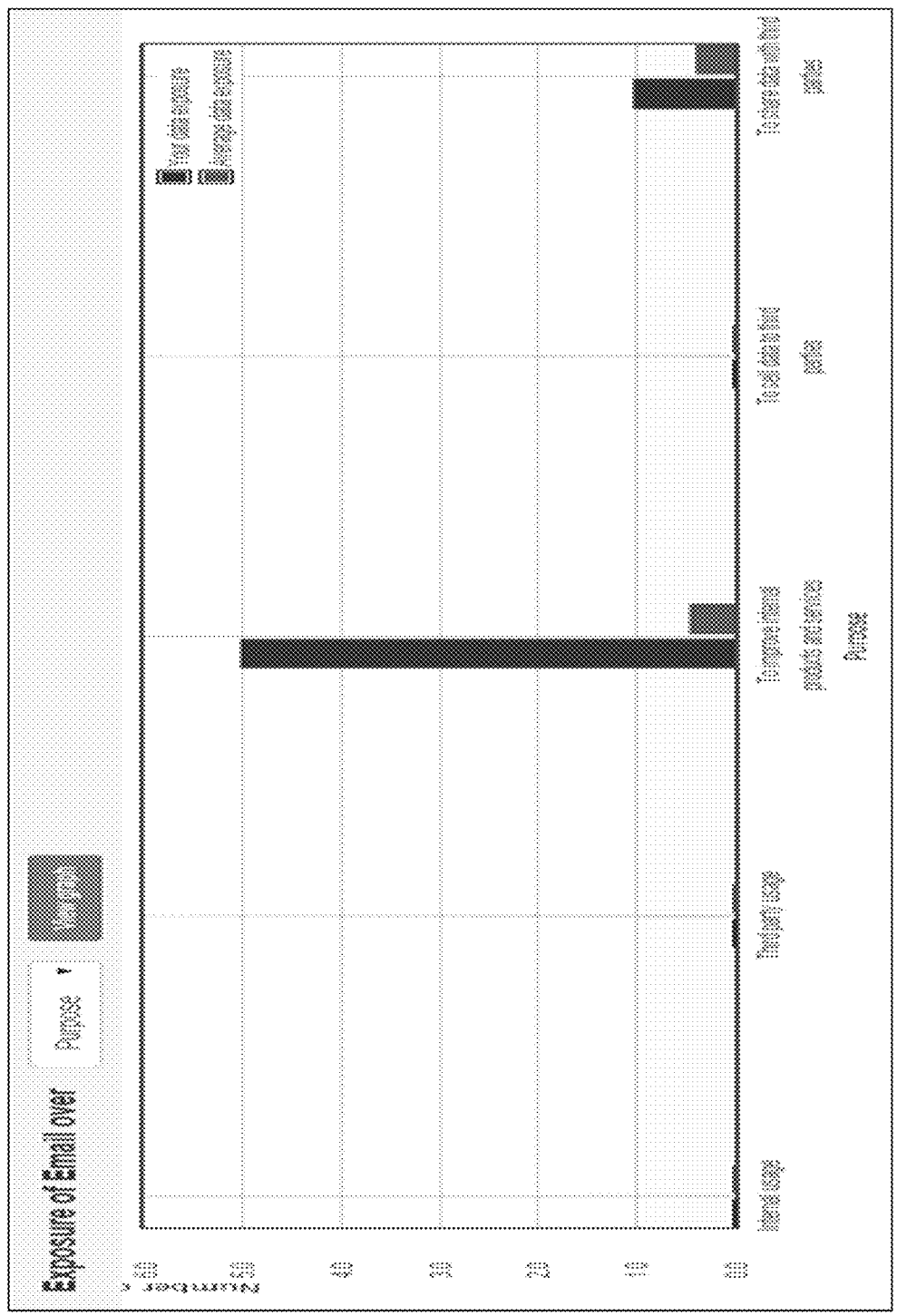

Referring to FIG. 8C, a detailed report presenting the for different purposes such as "internal usage," "Third party usage," "To improve internal products and services," "To sell data to third parties," and "To share with third parties" are presented. The report also provides a comparison of the exposure of the sensitive data pertaining to said fields for the customer and the average sensitive data exposure for other customers.

Referring to FIG. 8D now, a privacy statement generated by the system 200/300 for the customer for a time period (for example, a month) is illustrated. The privacy statement is shown to include various fields of sensitive data (for example, date of birth, and so on) that are accessed over the time period, the intended party accessing the data, contextual information such as the purpose of accessing said data, type of notification, final action that was taken (which can be different from the predefined preferences), the timestamp of accessing the data, customer's device and location of said device. Herein, in certain embodiments, the customer's device information and the location information of the device can be accessed in case of certain specific preferences, such as ask consent. This may be helpful to determine the authenticity of the customer providing the consent for accessing the sensitive data.

Summarized Scenario

Organizations hold variety of their customers' data. Organizations collect personal data and generate sensitive data to run their day-to-day operations. Organizations may also utilize said sensitive data to deliver value added services/products to their customers. The customers who are true owners of data may not have any say about how the data should be used, with whom they want to share and for what purposes. To equip the customers' with controls over their personal and sensitive data, the system is configured in a manner to allow the customers to define privacy preferences thereof. Further the system enables in enforcing said preferences in real-time. An example of preference setting in a contract management and execution scenario is disclosed below.

"Contract management includes negotiating the terms and conditions in contracts and ensuring compliance with the terms and conditions, as well as documenting and agreeing on any changes or amendments that may arise during its implementation or execution." The disclosed system 200/300 provides a mechanism of enforcing the customer's preferences. The system may receive the terms and conditions of the contract (in legal language) encoded into a plurality of preferences, and enforce said preferences. As is illustrated in an example process flow 900 in FIG. 9A, the system can map the "Terms and Conditions" defined in the legal language of contracts into the preferences. Since the system is extensible and flexible, the preferences defined herein are not static preferences, and can be updated by adding new preferences and/or deleting the old preference, or replacing the old preferences with the new preferences. Also, for the preferences defined in the system, the system can further define corresponding actions. An example preference model 950 that can be defined is illustrated in FIG. 9B.

Figure 9A:
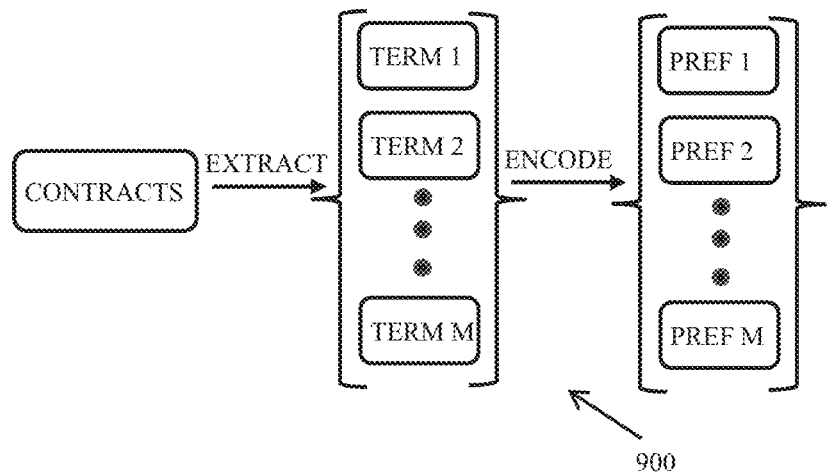
FIGS. 9A-9B illustrates a summarized scenario for managing data privacy in accordance with an example embodiment.
Figure 9B:
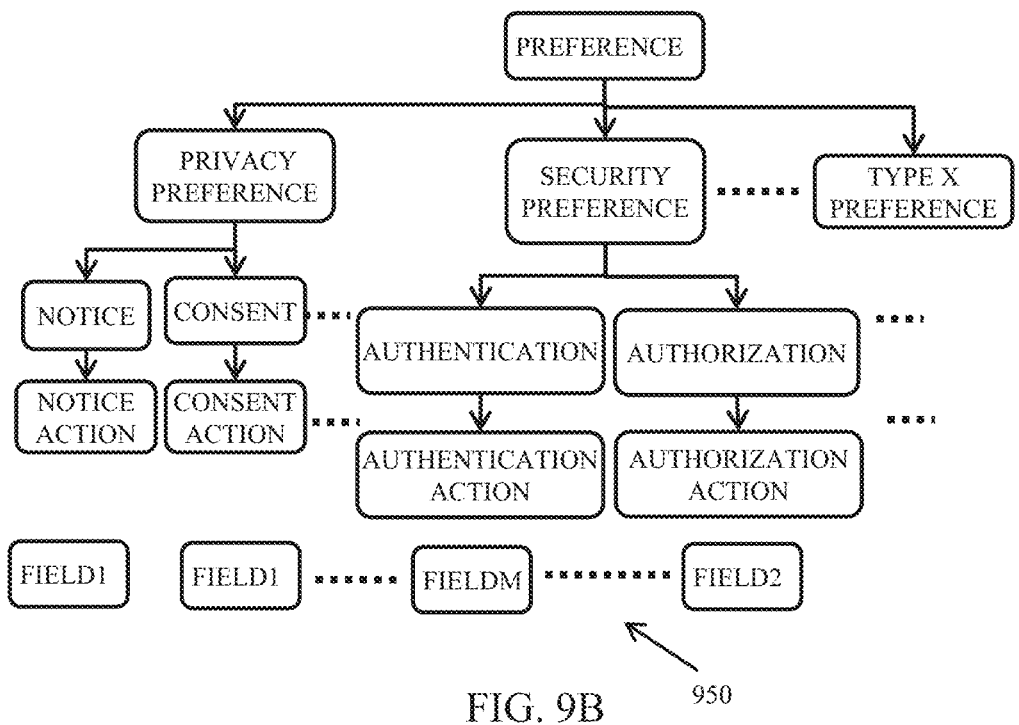

As illustrated in FIG. 9B, the preference model 950 includes various types of generic preferences such as 'Privacy preferences,' Security preferences' and so on. Each type of preference has a set of principles/obligations. Those principles are defined by International body such as OECD (defined Privacy principles) and accepted by members. If such principles are not available as standard, those can be defined by Enterprise or even can be defined at project level. Preferences need to be interpreted (by interpretation function) so that they could be made enforceable by the system preferences enforcement mechanism. The interpretation function can interpret the preferences and map them onto actions. Interpretation of principles may include understanding of principles under various scenarios. Formulating the requirements for principles, designing them and implementing them are minimum numbers of steps require to be executed to make them enforceable.

As described above, the system and method for managing privacy data can be utilized for defining access preferences related to contract management. It will however, be understood that the disclosed system can be utilized for accessing the preferences to manage privacy of data in various applications and scenarios, other than those that are described herein. For instance, in one example scenario, the disclosed system can be utilized for preventing "Shoulder surfing attacks". The term "Shoulder surfing attack" refers to a scenario where a user's information (for example, sensitive data such as a password) may be read or filmed or recorded by an unintended person/device without user's knowledge while the user is accessing such information. The unintended person/party may access said information while being located in vicinity of the user when the user accesses said information. The disclosed system incorporates a mechanism where the information is shared on a need-basis. For example, the sensitive information of the user may be masked or hidden unless an approval to access the same is received from the user. Accordingly, by sharing the information on a need basis or on basis of requirements, the system prevents instances of shoulder-surfing attack.

In another scenario, when a device incorporating the first application is to be accessed by another user other than an authorized user of the device, the authorized user can define the preferences (such as, notify access, ask consent, allow access, deny access and so on) through the second application. Such access preferences may enable or disable the access of the sensitive data on the device based on the access preferences defined by the authorised user. For instance, in case of production support, the authorized person having authorization to access a device may wish to allow other persons to access the device. In such a scenario the authorized person may define preferences to disable access of the other person to some of the sensitive data.

In yet another scenario, when a screenshot of an existing issue on a computing device is taken, the screenshot may inadvertently capture sensitive data also that may be displayed on a screen of user's device at the time of taking the screenshot. The user may then share the screenshot with a third party for resolution of the issue, and along with the issue, the sensitive data also gets revealed to the third party. In order to prevent the inadvertent disclosure of the sensitive data, the disclosed system enables masking of the sensitive data and unless an access to the sensitive data is granted, the disclosed system does not allow display of the sensitive data.

Additionally, the disclosed system enables in increasing the productivity by masking the data which is not required at the moment. The system enables unmasking of the data which is required by enforcing the preferences.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The foregoing description of the specific implementations and embodiments will so fully reveal the general nature of the implementations and embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A computer-implemented method for managing data privacy, the method comprising:
    generating a trigger notification in response to an access to at least one of a plurality of fields in a first application, wherein the first application comprises the plurality of fields comprising sensitive data integrated with a trigger notification generated by a second application;
    defining one or more access preferences corresponding to the at least one of the plurality of fields based at least on one of a plurality of preconfigured rules and contextual information associated with the trigger notification, wherein the one or more access preferences are updated dynamically for each of the fields; and
    enforcing the one or more access preferences to monitor a user's behavior and response pertaining to the one or more access preferences defined for the at least one of the plurality of fields by the second application on the generation of the trigger notification, wherein enforcing the one or more access preferences facilitates managing data privacy, wherein monitoring the user's behavior and response comprises:
        communicating with the user in real-time to receive the user's response to the trigger notification, wherein communicating comprises providing at least a part of the contextual information corresponding to the trigger notification to the user;
        enforcing one of allowing access and denying access to the at least one of the plurality of fields based on the user's response;
        determining the user's responses to previous trigger notifications corresponding to the access to the at least one of the plurality of fields in the first application over a time period;
        dynamically updating the one or more access preferences based on the determination of the user's responses over the time period;
        computing a data exposure value indicative of an exposure of the sensitive data associated with the user, the data exposure value computed based on access information associated with the access of the sensitive data and the user's responses to the previous trigger notifications over the time period; and
        generating an alert upon a determination of the data exposure value exceeding a threshold value of the data exposure value.

2. The method of claim 1 wherein the one or more access preferences comprises one or more of an access-type preference and an access-time preference, the access-type preference comprising one of allowing access, denying access, asking for consent, a notice for consent to access the sensitive data, and the access-time preference comprising a preferred time and preferred date of communicating the trigger notifications.

3. The method of claim 1 further comprising providing a comparison of an extent of exposure of the at least one of the plurality of fields corresponding to a plurality of profiles subscribed with the first application.

4. The method of claim 1 further comprising causing a receipt of the contextual information prior to generating the trigger notification, the contextual information comprising at least one of a purpose of accessing the sensitive data corresponding to the at least one of the plurality of fields, a history of user interest, offers provided to a user, and a role of an intended party accessing the sensitive data.

5. The method of claim 1 wherein the plurality of preconfigured rules are configured based on a user input.

6. A computer-implemented system for managing data privacy comprising:
    at least one memory; and
    at least one processor, the at least one memory coupled to the at least one processor wherein the at least one processor is capable of executing programmed instructions stored in the at least one memory to:

generate a trigger notification in response to an access to at least one of a plurality of fields in a first application, wherein the first application comprises the plurality of fields comprising sensitive data integrated with a trigger notification generated by a second application;

define one or more access preferences corresponding to the at least one of the plurality of fields based at least on one of a plurality of preconfigured rules and contextual information associated with the trigger notification, wherein the one or more access preferences are updated dynamically for each of the fields; and enforce the one or more access preferences to monitor a user's behavior and response pertaining to the one or more access preferences defined for the at least one of the plurality of fields by the second application on the generation of the trigger notification, wherein enforcing the one or more access preferences facilitates managing data privacy, wherein monitoring the user's behavior and response comprises:

communicating with the user in real-time to receive the user's response to the trigger notification, wherein communicating comprises providing at least a part of the contextual information corresponding to the trigger notification to the user;

enforcing one of allowing access and denying access to the at least one of the plurality of fields based on the user's response;

determining the user's response to previous trigger notifications corresponding to the access to the at least one of the plurality of fields in the first application over a time period;

dynamically updating the one or more access preferences based on the determination of the user's response over the time period;

computing a data exposure value indicative of an exposure of the sensitive data associated with the user, the data exposure value computed based on access information associated with the access of the sensitive data and the user's responses to the previous trigger notifications over the time period; and generating an alert upon a determination of the data exposure value exceeding a threshold value of the data exposure value.

7. The system of claim 6 wherein the one or more access preferences comprises one or more of an access-type preference and an access-time preference, the access-type preference comprising one of allowing access, denying access, asking for consent, a notice for consent to access the sensitive data, and the access-time preference comprising a preferred time and preferred date of communicating the trigger notifications.

8. The system of claim 6 wherein said at least one processor is further configured by the instructions to provide a comparison of an extent of exposure of the at least one of the plurality of fields corresponding to a plurality of profiles subscribed with the first application.

9. The system of claim 6 wherein said at least one processor is further configured by the instructions to cause a receipt of the contextual information prior to generating the trigger notification, the contextual information comprising at least one of a purpose of accessing the sensitive data corresponding to the at least one of the plurality of fields, a history of user interest, offers provided to a user, and a role of an intended party accessing the sensitive data.

10. The system of claim 6 wherein the plurality of preconfigured rules are configured based on user input.

11. A non-transitory computer readable medium embodying a program executable in a computing device for managing data privacy, the method comprising:

generating a trigger notification in response to an access to at least one of a plurality of fields in a first application, wherein the first application comprises the plurality of fields comprising sensitive data integrated with a trigger notification generated by a second application; and defining one or more access preferences corresponding to the at least one of the plurality of fields based at least on one of a plurality of preconfigured rules and contextual information associated with the trigger notification, wherein the one or more access preferences are updated dynamically for each of the fields; and enforcing the one or more access preferences to monitor a user's behavior and response pertaining to the one or more access preferences defined for the at least one of the plurality of fields by the second application on the generation of the trigger notification, wherein enforcing the one or more access preferences facilitates managing data privacy, wherein monitoring the user's behavior and response comprises:

communicating with the user in real-time to receive the user's response to the trigger notification, wherein communicating comprises providing at least a part of the contextual information corresponding to the trigger notification to the user;

enforcing one of allowing access and denying access to the at least one of the plurality of fields based on the user's response;

determining the user's responses to previous trigger notifications corresponding to the access to the at least one of the plurality of fields in the first application over a time period;

dynamically updating the one or more access preferences based on the determination of the user's responses over the time period;

computing a data exposure value indicative of an exposure of the sensitive data associated with the user, the data exposure value computed based on access information associated with the access of the sensitive data and the user's responses to the previous trigger notifications over the time period; and generating an alert upon a determination of the data exposure value exceeding a threshold value of the data exposure value.

\* \* \* \* \*